US007119676B1

(12) United States Patent
Silverstrim et al.

(10) Patent No.: US 7,119,676 B1
(45) Date of Patent: Oct. 10, 2006

(54) METHOD AND APPARATUS FOR MULTI-WAVEFORM WIRELESS SENSOR NETWORK

(75) Inventors: James E. Silverstrim, Forest, VA (US);
W. Eric Holland, Lynchburg, VA (US);
Kent Colling, Forest, VA (US)

(73) Assignee: Innovative Wireless Technologies, Inc., Forest, VA (US)

( * ) Notice: Subject to any disclaimer, the term of this patent is extended or adjusted under 35 U.S.C. 154(b) by 108 days.

(21) Appl. No.: 10/895,908

(22) Filed: Jul. 22, 2004

Related U.S. Application Data

(60) Provisional application No. 60/509,536, filed on Oct. 9, 2003.

(51) Int. Cl.
*G08B 1/00* (2006.01)
(52) U.S. Cl. ...................... 340/531; 340/506; 340/522; 340/539.1
(58) Field of Classification Search ................ 340/531, 340/506, 507, 508, 522, 539.1, 505
See application file for complete search history.

(56) References Cited

U.S. PATENT DOCUMENTS

| | | | |
|---|---|---|---|
| 6,177,861 B1 | 1/2001 | MacLellan et al. | |
| 6,181,734 B1 | 1/2001 | Palermo | |
| 6,208,247 B1 | 3/2001 | Agre et al. | |
| 6,584,146 B1 | 6/2003 | Bose et al. | |
| 6,610,977 B1 | 8/2003 | Megerle | |
| 6,832,251 B1 | 12/2004 | Gelvin et al. | |
| 6,873,256 B1 * | 3/2005 | Lemelson et al. | ........ 340/539.1 |
| 6,914,533 B1 * | 7/2005 | Petite | .......................... 340/628 |
| 6,930,596 B1 * | 8/2005 | Kulesz et al. | ................ 340/506 |
| 6,940,403 B1 * | 9/2005 | Kail, IV | ................. 340/539.12 |
| 2002/0099854 A1 | 7/2002 | Jorgensen | |
| 2002/0144537 A1 | 10/2002 | Sharp et al. | |
| 2003/0050055 A1 | 3/2003 | Ting et al. | |
| 2003/0061344 A1 | 3/2003 | Monroe | |
| 2003/0114986 A1 | 6/2003 | Padmanabhan et al. | |
| 2003/0154262 A1 | 8/2003 | Kaiser et al. | |
| 2003/0158954 A1 | 8/2003 | Williams | |
| 2004/0012491 A1 | 1/2004 | Kulesz et al. | |
| 2004/0119591 A1 | 6/2004 | Peeters | |
| 2004/0217881 A1 | 11/2004 | Pedyash et al. | |

* cited by examiner

*Primary Examiner*—Daryl C Pope
(74) *Attorney, Agent, or Firm*—Stevens, Davis, Miller & Mosher, LLP

(57) ABSTRACT

Methods and apparatus for a multi-waveform wireless sensor network based on widely distributed sensor nodes operating in wireless local area networks and gateway connection to an operations center via wide area network protocol. The scaleable network consists of a tiered structure of sensor nodes within wireless local area networks using an ad hoc protocol to form the network and at least one gateway node within each LAN to provide a link to an operations center. The sensor network can be used to detect and track Chemical, Biological, Radiological, Nuclear, and high-yield Explosive events.

31 Claims, 4 Drawing Sheets

METHOD AND APPARATUS FOR MULTI-WAVEFORM WIRELESS SENSOR NETWORK

CROSS-REFERENCE TO RELATED APPLICATION

This claims priority from U.S. Provisional patent application Ser. No. 60/509,536 filed Oct. 9, 2003 incorporated herein by reference.

BACKGROUND OF THE INVENTION

1. Field of the Invention

The present invention relates to Multi-Waveform Wireless Sensor Nodes that can be deployed to provide a nationwide sensor network.

2. Description of the Related Art

As background, the following U.S. patents and published patent applications are hereby incorporated by reference as is fully set forth herein: U.S. Pat. Nos. 6,584,146; 6,181,734; 20030158954; 20030050055; 20020099854; 20030154262; 20030061344; 20020144537; 20030114986; and 20030085348.

Security concerns have resulted in a major effort to develop pre-event and post-event response plans in case of an attack. Any such response plan depends on getting real-time information from sensors around the point of attack to detect and track safety conditions. The prior art sensors that detect and track Chemical, Biological, Radiological, Nuclear, and high-yield Explosive (CBRNE) are large and expensive so they cannot be widely distributed in a cost effective manner. Further, event detection is heavily dependent on the detection characteristics of the sensors. Further, most existing CBRNE sensors are limited in detection range and can only be deployed in a limited number of high traffic choke points. A limited number of detection points or nodes make detection difficult and the high cost of the nodes makes wide deployment financially prohibitive. Recent sensor research has resulted in reducing sensor size and cost so that a nationwide sensor network for pre- and post-event monitoring and reporting is now feasible. However, these new sensors need a reliable wireless network to process and distribute sensor data to central operation centers for monitoring and control.

Thus, there is a need to develop cost effective sensors with a reliable wireless data network for collaborative detection, location, assessment, and tracking of threats. A low cost, wireless network with long battery life that is capable of being deployed in many different environments can achieve such a solution. A complete wireless sensor network includes access points, or gateways, into existing data infrastructure for reachback communications to command and control centers.

SUMMARY OF THE INVENTION

In a preferred embodiment, the present invention provides a mechanism for a scaleable wireless sensor network having a three-tier structure of sensor nodes to detect and track CBRNE attacks. The scaleable wireless sensor network comprises widely distributed sensor nodes as part of wireless local area networks (LAN) connected to a remote operations center via gateways with wide area network (WAN) interfaces. Each sensor node includes a wideband transceiver and software defined radio to support operation on licensed and unlicensed spectrum for LAN's using commercial wireless or proprietary protocols. The wireless LAN is deployed initially with commercial unlicensed spectrum and then can be transitioned to licensed spectrum as it becomes available.

In a preferred embodiment, as illustrated in FIG. 1, the present invention provides the best waveforms for a widely distributed sensor network comprising wireless operation for a local area network (WLAN) 101, and wireless and/or wireline operation for a wide area network (WAN) 102. The WLAN 102 provides communications between local sensor nodes 104 and a gateway node 105 that supports both the WLAN waveform and the WAN waveform. The WAN 102 provides communications from the gateway nodes 105 to an operation center (not shown) for command and control. The operations center collects data from all of the sensor nodes, performs an assessment and then makes decisions based on the results.

No single prior art WLAN waveform meets the spectrum availability and data link reliability necessary for a nationwide network. Therefore, the system and method of the present invention provide a multi-waveform sensor node that can support multiple wireless protocols for the WLAN 101 and multiple wireless and wireline protocols for the WAN 102. In a preferred embodiment, a common system and method supports multiple waveforms that are selected at installation or can be downloaded over-the-air. This provides the flexibility to use any standard waveform or proprietary waveform that fits within the design constraints of the transceiver, processor and external interfaces.

The foregoing and other features and advantages of the invention will be apparent from the following, more detailed description of preferred embodiments as illustrated in the accompanying drawings in which reference characters refer to the same parts throughout the various views.

DETAILED DESCRIPTION OF THE INVENTION

It is to be understood by persons of ordinary skill in the art that the following descriptions are provided for purposes of illustration and not for limitation. An artisan understands there are many variations that lie within the spirit of the invention and the scope of the appended claims. Unnecessary detail of known functions and operations may be omitted from the current description so as not to obscure the present invention.

The wireless sensor network of the present invention comprises multi-waveform nodes and provides low cost, low power wireless links for multiple applications including homeland security, law enforcement, search and rescue and commercial applications. In the event of a CBRNE attack, locally based personnel will be the first responders. However, emergency coordinators lack the ability to rapidly detect, locate, assess, track, and respond to CBRNE events. Therefore, coordinated and informed decisions cannot be made or communicated in a timely manner, which can cause loss of life. Implementation of a real-time sensor network, according to the present invention, improves the response capabilities and speed of these limited and specialized first response resources. This network provides broad coordination at the local, state, and federal levels of government response agencies.

A critical component of the present invention is a wireless sensor network. Characteristics of the wireless sensor network include:

rapid deployment;
reliable data link operation;
comprehensive threat detection, assessment and tracking;
automatic adjustment to multiple background environments;
support for both pre and post-event scenarios;
redundancy;
data security and physical security;
multiple sensor types;
flexibility for different deployment scenarios;
centralized operation for failure detection, maintenance, configuration and software upgrades; and
integrated data transfer and communications.

Sensor Network Architecture

Figure 1:
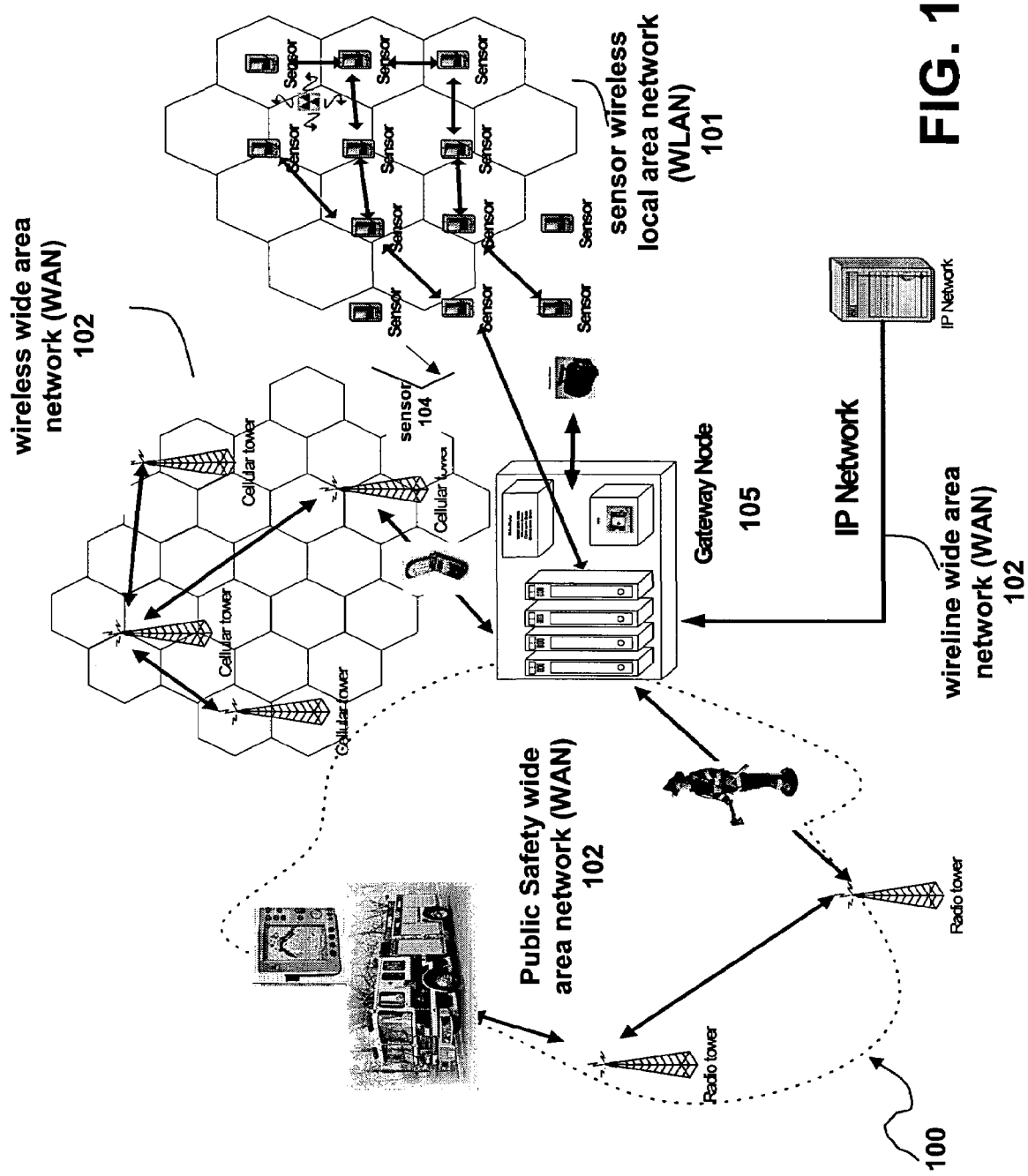
FIG. 1 illustrates the concept of sensor network deployment according to an embodiment of the present invention.

A preferred embodiment of the present invention provides a sensor network, illustrated in FIG. 1, as a flexible open architecture that serves as a communication platform for multiple deployment scenarios and sensor types. Sensors may track, for example, one or more CBRNE events, such as, a nuclear radiation sensor and/or a chemical sensor may be employed. For example, a chemical sensor may take an air sample and measure its properties. A network according to a preferred embodiment, can be deployed to cover a whole city, high traffic choke points, high value assets, or deployed locally in rapid response emergency situations. Sensors can be placed in various fixed or mobile locations. Typical fixed locations include buildings, poles/towers for power or telephone lines or cellular towers or traffic lights. The fundamental capability of the sensor network, in a preferred embodiment, is real-time operation capability. The system possesses the capability to rapidly detect, locate, characterize, report, track, and respond to threats. The key aspects of this preferred embodiment are deployment flexibility of the system, seamless scalability from small to large networks, network redundancy, and low cost for dense node placement.

The gateway nodes (GWNs) 105 are distributed within the network to provide reachback links to existing public or private infrastructure types such as cellular, land mobile radio, and wired or wireless IP access points. Example standards include GSM, CDMA2000, TDMA, IEEE 802.11, IEEE 802.16, APCO Project 25, Ethernet, DOCSIS cable modems, and DSL. A GWN 105 works as both a sensor network data concentrator as well as a reachback vehicle with existing communication infrastructures (ex. land mobile radio, cellular, broadband data, etc.). In essence, it provides transparent communications across different physical layers.

In a preferred embodiment, the gateway node 105 can dynamically re-assign the primary reachback communication medium based on available services. When one network is at capacity, unavailable, or damaged, a gateway node 105 can automatically re-route information via an alternate protocol.

In a preferred embodiment, redundant local servers provide network management functions such as Dynamic Host Configuration Protocol (DHCP) for Internet Protocol (IP) address assignment, Simple Network Management Protocol (SNMP) for device control, and security through an Electronic Key Management System (EKMS). Encryption for unattended devices is limited to Type III algorithms such as the advanced encryption standard (AES). More secure encryption schemes can be applied at higher layers where aggregated data and decision information is present. Provisioning of the network bandwidth is controlled from the local server. The provisioning ensures sufficient Quality of Service (QoS) is maintained in the local network such that sensor data from emergency events do not flood the available bandwidth on the reachback infrastructure system.

Multi-Waveform Sensor Local Area Network Architecture

Figure 2:
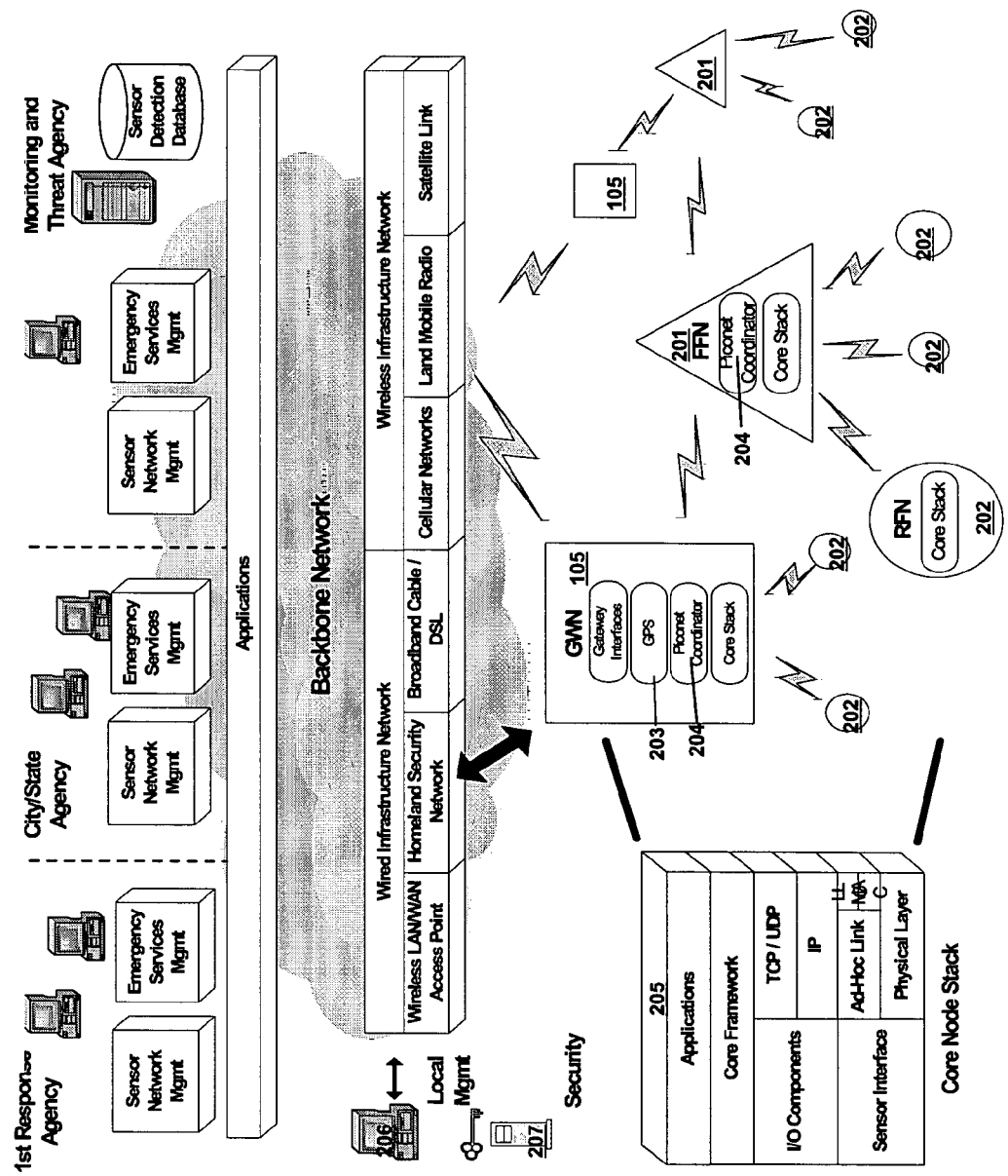
FIG. 2 illustrates a network architecture according to an embodiment of the present invention.

The system and method of the present invention provide a CBRNE response network to supply first responders with critical event detection information, as illustrated in FIG. 1. In a preferred embodiment, three tiers of wireless sensor nodes are provided in the network, as illustrated in FIG. 2:

Gateway node 105 (GWN) supports the transfer of information between the WLAN 101 and WAN 102 infrastructure. It is a highly modular design that can be implemented as a fixed or mobile device. A GWN 105 includes all of the functions of a full function node FFN 201 (see FIG. 2) and operates from an AC or DC power source.

Full function node 201 (FFN) operates on the WLAN 102. Each FFN 201 has the capability to coordinate individual piconets (subnets) within the sensor network and route data through the network to GWN 105 access points. A FFN 201 can operate from an AC or DC power source.

Reduced function node 202 (RFN) is an ultra-low power, low cost unit typically operating on battery power. The RFN 202 is a piconet client (or slave) with massive deployment of units operating on the WLAN 102.

In a preferred embodiment, the capabilities of the nodes are synonymous with detection characteristics of the sensors. This is part of the motivation for a three-tiered hierarchical approach. The RFN nodes 202 are deployed with a communication range that is balanced with the detection range of the sensor and desired density of the network. This achieves the necessary long battery life and low price points for RFNs 202 to support massive deployment. Sensors with more advanced detection and classification capabilities are assumed herein to be more expensive and consume more power. These advanced sensor types are coupled with the FFN 201 or GWN 105 nodes where the distribution density is lower. To save on node battery life, the sensor radio nodes are put to sleep and wakeup on event detection. The nodes may be powered by any suitable power source. For example, the nodes may be battery powered, fuel cell powered, or solar powered to directly power operation or to charge their batteries.

The networked gateway node 105 provides a very flexible design for use in multiple novel scenarios such as serving as a repeater in a subway where traditional signals are not present. The concept includes mobile nodes with GWN 105 capability that move throughout the network in areas where fixed sensors are not present. Mobile sweeper nodes are included in the network to roam about providing coverage outside the core network or in areas between piconets within the network. The mobile nodes can be mounted on vehicles such as squad cars, trucks, and trains, or can be hand portable devices. The intent is for mobile nodes to register with and pass data to FFNs 201 located at fixed locations such as traffic lights. Detection events can be reported within the network or directly to the infrastructure network in the case where the mobile node has roamed beyond the fixed sensor network (i.e. a rural or suburban setting). GPS modules 203 can be embedded within the nodes as location reference points. In a preferred embodiment, the GWN 105 is powered from commercial AC with battery backup in fixed location or DC power in mobile application. For handheld devices the batteries are rechargeable since battery life is on the order of several hours.

In a preferred embodiment, FFNs 201 are mid-tier nodes capable of operating as a piconet coordinator 204 or client. An FFN 201 can provide multi-sensor fusion of detection data from low-tier RFN nodes 202, redundant routing of data through the network, and greater link range. FFNs 201 provide piconet (cluster) coordination 204 or they can serve as more capable replacements for RFNs 202 within the network. The tradeoff for increased capability is increased cost, size, and power consumption. The sensor interface includes the same capabilities as RFNs 202, but these nodes can be coupled with more advanced, active sensors for threat assessment and tracking. Inter-piconet communications can occur between FFNs 201 in a peer-to-peer (P2P) manner. The FFN 201 and GWN 105 nodes possess sufficient processing capabilities to perform correlation of sensor detection data thus increasing the probability of detection while decreasing the probability of false positives.

In a preferred embodiment, RFN nodes 202 are low tier, extremely low cost, small size, and low power devices. Each RFN node, in a preferred embodiment, has a size less than 7 cubic inches and consumes less than 3 watts in transmit power. Preferably each RFN node consumes less than 1 watt in transmit power. Also, preferably each RFN node has a low cost, for example each RFN node has less than a \$15 bill of material cost. In a preferred embodiment, these nodes are massively deployed and coupled with low cost, low power passive sensors. Use scenarios for these nodes include rapid and dense placement in post-event plume tracking or wearable wireless dosimeter badges for pre- or early event detection. All communication from RFN nodes 202 are coordinated through FFN 201 or GWN 105 nodes. This configuration forms a classic master-slave star topology for each node cluster, or piconet.

Reliable communications for a CBRNE sensor network are provided in a preferred embodiment by combining a reliable and secure RF physical layer with an ad-hoc networking data link layer that is self-configuring, energy efficient, and scaleable to variable size networks. The communication solution of this preferred embodiment ensures a reliable and secure RF physical layer connection;

exercises adaptable, interoperable waveforms that can satisfy many different deployment scenarios; and provides data link layer ad hoc networking that supports priority service, collaborative sensor fusion, and scalability to variable size networks.

The core communication functionality 205 of each node type is effectively the same, but each tier progressively increases capability at the expense of increased cost and power consumption, in a preferred embodiment. The core framework layer essentially provides a standardized technique for packaging sensor data such that it is properly interpreted at all layers of the system. The GWN nodes 105 are similar to FFN's 201 with added interface capabilities and software to support stack translation between various protocols. The core node stack follows the standard OSI model commonly found in most internet enabled devices. The key layers that require unique attention for the present invention are the physical layer, the ad-hoc link layer, and core framework layer. Choice of physical layer determines communication range, synchronization, power consumption, node cost, interference immunity (thus reliability), multipath performance, and data rate. The ad-hoc link layer controls automatic formation of the network topology, power control, and maintenance of reliable link connections within the network.

Ad-hoc networking protocols provide mechanisms for automatic configuration, rapid deployment, self-healing and redundant data routes, range extension, and energy efficient communications. The ad-hoc network passes data node to node throughout the network. This capability provides range extension and allows all fixed or mobile nodes to communicate with any other node in the network. The result is a highly redundant network with multiple routes to gateways that interface to existing infrastructure communication systems. Information is passed to decision-making centers and is also passed back for dissemination to the first responders roaming within the network. This achieves a totally integrated, widely distributed monitoring system that serves as a communication platform for multiple sensor types and also serves as a rapid information dissemination system. Decision information passed back through the network or through traditional first response channels provides on-scene commanders the best response information possible to save lives, assets, and/or remove the threat. In an alternative embodiment, data can also be passed to traffic information signs, and can be used for coordination of the traffic light network for rapid evacuation flow control.

Existing wireless ad-hoc networking with an IP network layer include the IEEE 802.11 standard and IEEE 802.15.1 (Bluetooth). Both standard technologies do an excellent job filling the role for which they were designed. However, the link protocols do not form the desired network topology to achieve an optimal deployment solution. Also, the use of unlicensed spectrum bands allows fast deployment anywhere, anytime, but may not meet reliability requirements for mission critical communications. These bands are not dedicated and can easily be jammed by commercial users.

A preferred embodiment employing a software defined radio leverages advanced processing technology to effectively replace multiple radios that support specific waveforms with one radio that supports multiple waveforms. This technology is based on a wideband transceiver coupled with a programmable processor and a standard software environment such that the sensor radio can support multiple waveforms all via software control. In the absence of dedicated security spectrum, and with open physical layer questions remaining in regard to licensed spectrum availability and interference concerns in unlicensed bands, the system and method of the present invention provides an adaptable solution comprising a single hardware platform with multiple commercial waveforms in a software defined wideband RF transceiver implementation. The waveforms supported in a preferred embodiment leverage existing nationwide WAN commercial infrastructure to provide coverage in a time frame and at cost points not attainable multiple independent solutions.

A key requirement of a reliable network solution is redundancy. Multiple data paths to decisions-making authorities are required to ensure critical communications is achieved. The network of sensor nodes of the present invention can be considered a network of micro-routers. Routing in the context of micro-routers faces many of the same challenges of traditional routers such as routing decisions, route discovery/repair, flow control, power control, etc. However, the size, battery life, throughput, and processing capabilities of a micro-router are orders of magnitude smaller than a traditional router.

Multi-Waveform Sensor Nodes

In a preferred embodiment, the wireless sensor network detects and tracks Chemical, Biological, Radiological, Nuclear, and high-yield Explosive (CBRNE) attacks using widely distributed sensor nodes organized as multiple ad hoc local area networks. The wireless sensor network has three types of sensor nodes Gateway Sensor Node (GSN) 105;
Full Function Sensor Node (FFN) 201; and
Reduced Function Sensor Node (RFN) 202.

The wireless sensor network typically supports data for the following WAN 102 waveforms:

APCO Project 25 for VHF (136–174 MHz), UHF (406–512 MHz) and 700/800 (764–869 MHz);
Cellular/PCS 800 MHz for ANSI-136, ANSI-95B;
Cellular/PCS 900 MHz for GSM/GPRS, ANSI-95B;
Cellular/PCS 1800 MHz for GSM/GPRS, ANSI-95B;
PCS 1900 MHz for ANSI-95B, GSM/GPRS 1900, EDGE 1900, CDMA20001xRTT;
Broadband Wireless—IEEE 802.16 and IEEE 802.20;
IP over Satellite;
IP over Ethernet;
IP over Cable;
IP over DSL; and
iDEN (806–866 MHz).

The wireless sensor network could be adapted to future developed waveforms.

Figure 3:
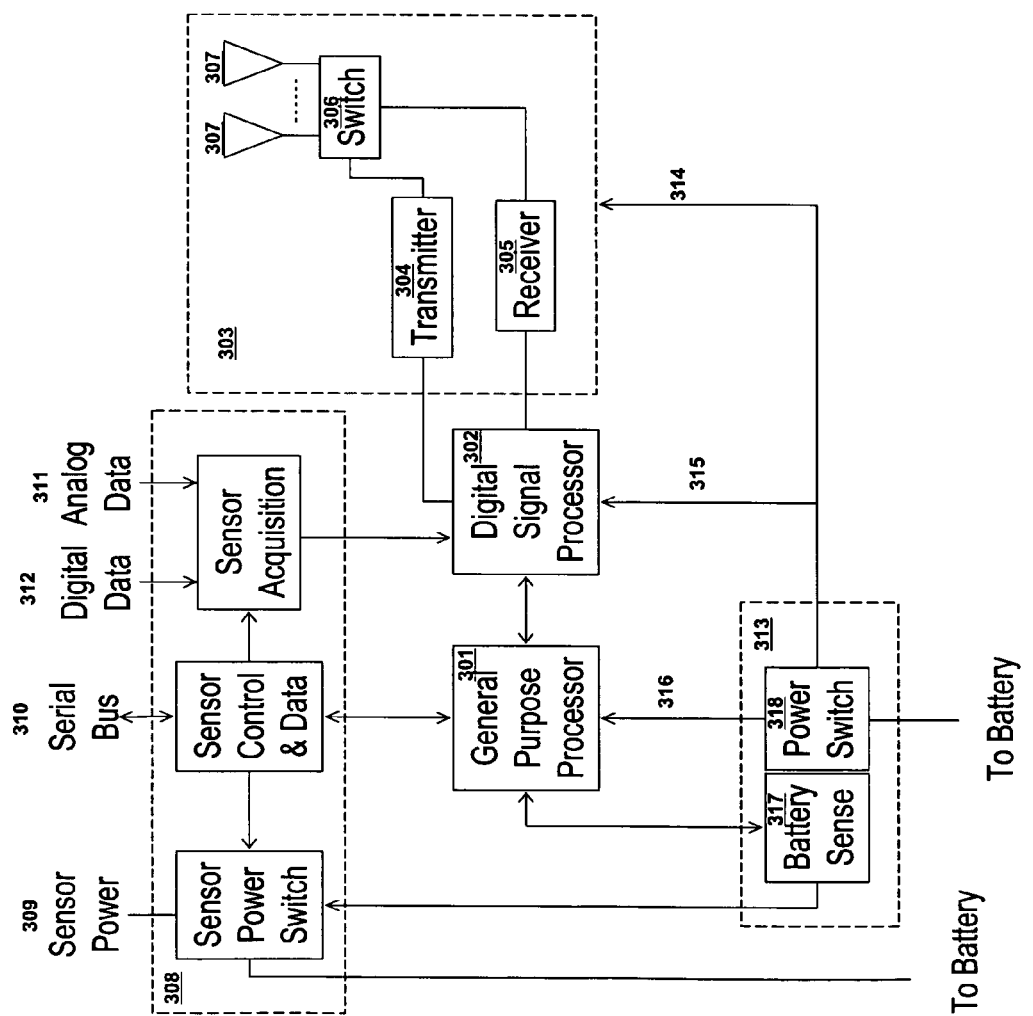
FIG. 3 illustrates a node architecture according to an embodiment of the present invention.

The wireless sensor network supports data for the following commercial WLAN 101 waveforms and licensed WLAN 101 waveforms:

IEEE 802.11b/g/a;
IEEE 802.15.1 (Bluetooth);
IEEE 802.15.3;
IEEE 802.15.3a (ultra wideband);
IWT variation of IEEE 802.15.3
IEEE 802.15.4;
IEEE 802.15.4a (ultra wideband);
4.9 GHz band for Public Safety (future);

Each sensor node comprises an embedded processor, wideband transceiver, software defined radio and sensor interface as shown in FIG. 3. Each node processes sensor information and transfers data to an operations center via the wireless sensor network.

The main processor of the radio assembly includes a General Purpose Processor (GPP) 301 and a Digital Signal Processor (DSP) 302

The transceiver 303 includes the transmitter 304 and receiver 305 chains, RF switch 306 and embedded antennas 307. The sensor interface 308 provides DC power 309, RS-232 serial bus 310 for control and low speed data, and a sensor acquisition interface for analog 311 and high speed digital data 312.

The battery interface 313 includes battery power control to the transceiver 314, DSP 315 and GPP 301, and the battery sensing circuit 317 that controls the processor and sensor power switches 318.

Physical interfaces are as follows:
Battery I/O includes power, ground, and temperature sensor to battery interface;
Sensor I/O includes power, ground, and serial RS-232. The actual interface will be dependent on the specific sensor; and
Transceiver I/O includes power, ground, Tx serial data, and Rx serial data. It also includes discrete signals for reference clock, Tx/Rx, Tx power, RSSI, and AGC control.
There is a board level serial and Ethernet connection on the processor board for software development, debug and factory programming.

Figure 4:
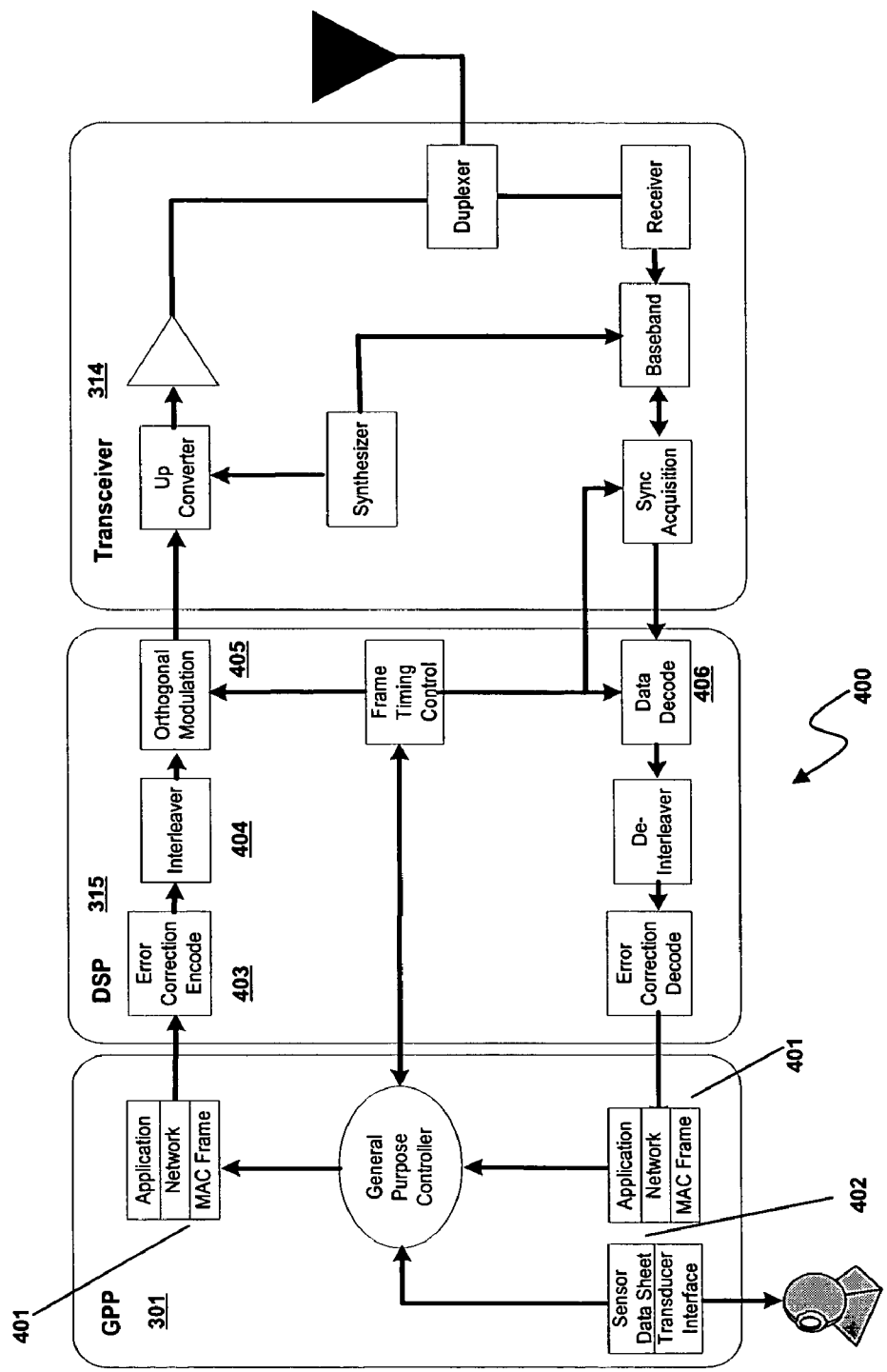
FIG. 4 illustrates a sensor node logical design according to an embodiment of the present invention.

The logical decomposition of functionality of a preferred embodiment of the present invention is illustrated in FIG. 4. The three main components of the logical architecture are the Transceiver 314, DSP 315, and General Purpose Processor (GPP) 301.

The GPP 301 is the primary controller for the sensor node. From a controller perspective it handles all power up initialization, configuration, diagnostics, and all dynamic configuration control for the sensor board. From a data processing perspective it effectively handles the MAC layer 401 processing and upper layers. Data received from the sensor comes directly to the GPP 301. The sensor application data is packaged in the appropriate data sheet format 402, stored, and transferred over a link when queried.

Processing intensive operations are handled in the DSP 315. The GPP 301 in general does the decision-making about what to do with a data frame and control the timing, whereas the DSP 315 handles the data processing algorithms, data encryption, and the assembly and parsing of the frames. Error correction codes encode 403 transmit data and correct bit errors in the received data. Interleaver 404 protect against fades by distributing adjacent bits such that burst errors do not corrupt entire words and give the forward error correction (FEC) codes a better chance of correcting the errors. The orthogonal modulation block 405 provides channelization between piconets and can also be used as a spreading code. The data decode block 406 keeps frame synchronization and uses the orthogonal modulation codes to perform the appropriate channel decode.

The sensor network nodes support multiple sensor types such as chemical, biological, radiological, nuclear, high-yield explosive, acoustic, magnetic, seismic, micro-radar motion and imaging for tracking one or more event types.

The WLAN 101 and WAN 102 waveforms support quality of service (QoS) to allow mixing of data types such as data, video and digital voice on the wireless sensor network.

All nodes interoperate with commercial equipment when operating with standard waveforms.

A GWN node 105 supports one or more instantiations of the WLAN 101 waveforms and two or more instantiations of the WAN 102 waveforms simultaneously. A GWN node 105 supports a primary and secondary WAN 102 waveform. It automatically switches to the secondary when the primary is not available. It automatically switches from the secondary to the primary when the primary is available. There is no data loss when the GWN 105 switches between the primary and secondary waveforms. Gateway sensor nodes (GWN) 105 support a network of:

nodes scattered in pseudo random fashion including GWN 105, FFN 201 and RFN 202 nodes;
Route table for IP addresses; and
multiple environments including rural, desert, mountain, forest, and urban areas.

GWN sensor nodes 105 include an Ethernet interface to sensors. During the loss of prime power, the GWN 105 is capable of retaining all configuration parameters stored or in operation at the time. The WLAN and WAN of the GWN 105 operate independently. A GWN node 105 operates on WAN 102 and WLAN 101 at the same time without degradation of specified performance of any operating waveform. A GWN 105 node is able to receive a GPS signal 203 from an external GPS receiver. A GWN 105 node allows automatic retransmission and routing operations between waveforms.

A FFN node 201 supports one or more instantiations of the WLAN 101 waveforms simultaneously. A FFN node 201 operates as a client or a piconet coordinator. It operates as a client if a piconet coordinator exists within its RF range. It operates as a piconet coordinator if a piconet coordinator does not exist. It automatically switches between client and coordinator within the constraints of the corresponding WLAN 101 standard. An FFN 201 node supports a low power sleep mode as provided by each waveform protocol to conserve power.

Full Function sensor nodes 201 (FFN) support a network of:
  nodes scattered in pseudo random fashion including GWN 105, FFN 201 and RFN 202 nodes;
  Route table for IP addresses; and
  multiple environments including rural, desert, mountain, forest, and urban areas.

FFN sensor nodes 201 include an Ethernet interface to sensors. During the loss of prime power, the FFN 201 is capable of retaining all configuration parameters stored or in operation at the time. An FFN node 201 allows automatic retransmission and routing operations between waveforms.

An RFN node 202 supports one instantiation of the WLAN 101 waveforms. An RFN node 202 operates as a piconet client on the WLAN 101 waveforms. An RFN 202 node supports a low power sleep mode as provided by each waveform protocol to conserve power. Reduced Function sensor nodes 202 (RFN) supports a network of:
  nodes scattered in pseudo random fashion; and
  multiple environments including rural, desert, mountain, forest, and urban areas.

All nodes have enough memory to support download of a new waveform without affecting operation of current waveforms. All waveforms are down-loadable, locally and over the air, and stored in non-volatile memory.

In general, regardless of type, sensor nodes have safeguards to reduce the possibility of unintentional reprogramming and to preclude the possibility of software storage errors. The operator is notified when a local or over the air download has successfully completed or failed. Waveforms are authenticated when they are locally or over the air downloaded into a sensor node. Sensor nodes have storage capacity to store presets and configuration information for each waveform stored. Provisions are included to prevent instantiating a waveform to an improperly configured channel. The sensor node provides positive confirmation to the operator following each successful instantiation. Sensor network nodes automatically self-organize into a robust, adaptive network for the WLAN 101 waveforms identified. Sensor network nodes 100 automatically reorganize to provide a reliable network made up of unreliable sensor nodes. Sensor nodes include RS-232 and USB 2.0 interface to sensors. Sensor nodes support:
  Internet standard IPv4 and IPv6;
  standard Internet protocols including DNS and DHCP for automatic provisioning;
  Internet standard NTP for network time distribution;
  Internet standard SNMPv3 for record-keeping, fault reporting, diagnostics, application download and configuration;
  providing the MIB II in accordance with RFC 1213 and registered with the Internet Assigned Numbers Authority (IANA) as a private enterprise MIB, structured in accordance with the Structure of Management Information (SMI) and its objects encoded with International Organization for Standardization's (ISO) Abstract Syntax Notation One (ASN.1) method using the Basic Encoding Rules (BER) to provide access to the functions and associated variables that support configuration, control, and monitor functions;
  Internet security standards for authorization, authentication, encryption, and key management;
  public and private key management;
  the Army Key Management System/Electronic Key Management System (AKMS/EKMS) key distribution and net management systems;
  data encryption standard (DES) and advanced encryption standard (AES) encryption standards;
  FIP-140-1 Level 1 compliance;
  built-in test and diagnostics to verify operation.
  amplitude, frequency, spatial and time discrimination techniques for anti-jamming;
  channel configuration/reconfiguration within the specified combinations of waveforms identified;
  changing a channel waveform, changing the channel operating parameters; monitor channel performance, and turning a channel on/off without affecting the operation of other waveforms; and
  automatic power control to minimize interference with other nodes After an unexpected power loss, or operator controlled shut down, and upon restoration of power to the radio set(s), each sensor node is capable of completing a components diagnostics test and automatic recovery. A sensor node transmitter sustains no damage when the RF output port(s) is open or shorted. A sensor node allows the operator to load time manually or over-the-air. Sample rate and reporting of sensors are configurable from 1 per second to 1 per day.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt the teaching of the present invention to a particular situation without departing from its central scope. Therefore it is intended that the present invention not be limited to the particular embodiments disclosed as the best mode contemplated for carrying out the present invention, but that the present invention include all embodiments falling within the scope of the appended claims.

What is claimed is:

1. A scaleable wireless sensor network, comprising:
  a plurality of multi-waveform sensor nodes that include wireless radio and sensors to detect and track events;
  at least one wireless local area network using at least one of a commercial and a proprietary ad hoc link and routing protocol that operationally connects said plurality of sensor nodes automatically;
  a gateway node operationally connected to said at least one wireless local area network; and
  an operations center connected to said gateway node using at least one standard wide area network protocol.

2. The network of claim 1, wherein said plurality of sensor node types comprises at least one of chemical sensor, biological sensor, radiological sensor, nuclear sensor, high-yield explosive sensor, acoustic sensor, magnetic sensor, seismic sensor, micro-radar motion sensor, and imaging sensor.

3. The network of claim 1, wherein each sensor node comprises an embedded processor and a wideband transceiver that supports multiple waveforms and multiple RF bands.

4. The network of claim 1, wherein said plurality of sensor nodes further comprises: at least one reduced function node; and at least one full function node.

5. The network of claim 1, wherein each node is further configured to process at least a single LAN waveform; and each gateway node is further configured to process at least a WAN waveform.

6. The network of claim 1, wherein each node is powered by a power source selected from the group consisting of battery, solar and fuel cell.

7. A scaleable wireless sensor network, comprising: a plurality of multi-waveform sensor nodes that detect and track events; at least one wireless local area network using at least one of a commercial and a proprietary ad hoc link protocol that operationally connects said plurality of sensor nodes; a gateway node operationally connected to said at least one wireless local area network; and an operations center operationally connected to said gateway node using at least one standard wide area network protocol; and said plurality of sensor nodes further comprises at least one reduced function model, and at least one full function node; and
wherein said plurality of sensor nodes further comprises at least one mobile sweeper node having gateway node capability that registers with and passes data to the at least one full function node.

8. A hierarchical wireless local area sensor node subnetwork, comprising:
at least one wireless local area network configured in at least one hierarchical layer having at least one of a commercial and a proprietary ad hoc link and routing protocol that operationally connects said plurality of sensor nodes automatically;
at least one sensor node selected from the group consisting of a full function node and a reduced function node; and
at least one gateway node for interfacing by at least one of wireless communication or wireline communication between the at least one subnetwork and the at least one decision-making authority.

9. A gateway node comprising:
at least two wideband transceivers for transmitting and receiving data over a medium; a sensor interface for controlling and acquiring sensor inputs;
at least one of a commercial and a proprietary ad hoc link and routing protocol that operationally connects said plurality of sensor nodes automatically;
a software defined radio operably connected to the sensor interface for receiving, processing and digitizing sensor input data and electronically connected to the at least two wideband transceivers for sending and receiving processed and digitized sensor data; and
a power interface for providing power to the at least two transceivers, the sensor interface and the software radio.

10. The gateway node of claim 9, wherein said software defined radio further comprises:
a digital signal processor operably connected to the sensor interface for processing and digitizing the acquired sensor input; and a general purpose processor operably interfaced to:
the sensor interface for controlling acquisition of sensor input from the sensor interface,
the digital signal processor for controlling processing of the sensor input,
the at least two transceivers for transmission of the processed and digitized sensor data and receipt and transmission of processing and digitized sensor data from another node, and
the power interface for control thereof.

11. A gateway node comprising: at least two wideband transceivers for transmitting and receiving data over a medium; a sensor interface for controlling and acquiring sensor inputs resulting from events; a software defined radio operably connected to the sensor interface for receiving, processing and digitizing sensor input data and electronically connected to the at least two wideband transceivers for sending and receiving processed and digitized sensor data; and a power interface for providing power to the at least two transceivers, the sensor interface and the software radio;
wherein said software defined radio further comprises: a digital signal processor operably connected to the sensor interface for processing and digitizing the acquired sensor input; and a general purpose processor operably interfaced to: the sensor interface for controlling acquisition of sensor input from the sensor interface, the digital signal processor for controlling processing of the sensor input, the at least two transceivers for transmission of the processed and digitized sensor data and receipt and transmission of processing and digitized sensor data from another node, and the power interface for control thereof; and
wherein said general purpose processor further comprises: core node stack software; LAN waveform software; and WAN waveform software.

12. The gateway node of claim 11, wherein said general purpose processor receives and processes inputs from multiple other nodes thereby improving detection performance and reducing a data rate to an operations center.

13. A full function node, comprising:
a wideband transceiver for transmitting and receiving data over a medium; a sensor interface for controlling and acquiring sensor inputs;
at least one of a commercial and a proprietary ad hoc link and routing protocol that operationally connects said plurality of sensor nodes automatically;
a software defined radio operably connected to the sensor interface for receiving, processing and digitizing sensor input data and electronically connected to the wideband transceiver for sending and receiving processed and digitized sensor data; and a power interface for providing power to the transceiver, the sensor interface and the software radio.

14. The full function node of claim 13, wherein said software-defined radio further comprises:
a digital signal processor operably connected to the sensor interface for processing and digitizing the acquired sensor input; and
a general purpose processor operably interfaced to:
the sensor interface for controlling acquisition of sensor input from the sensor interface,
the digital signal processor for controlling processing of the sensor input,
the transceiver for transmission of the processed and digitized sensor data and receipt and transmission of processing and digitized sensor data from another node, and
the power interface for control thereof.

15. A full function node, comprising: a wideband transceiver for transmitting and receiving data over a medium; a sensor interface for controlling and acquiring sensor inputs resulting from events; a software defined radio operably connected to the sensor interface for receiving, processing and digitizing sensor input data and electronically connected to the wideband transceiver for sending and receiving processed and digitized sensor data; and a power interface for providing power to the transceiver, the sensor interface and the software radio;

wherein said software-defined radio further comprises a digital signal processor operably connected to the sensor interface for processing and digitizing the acquired sensor input; and a general purpose processor operably interfaced to: the sensor interface for controlling acquisition of sensor input from the sensor interface, the digital signal processor for controlling processing of the sensor input, the transceiver for transmission of the processed and digitized sensor data and receipt and transmission of processing and digitized sensor data from another node, and the power interface for control thereof; and wherein said general purpose processor further comprises core node stack software; and LAN waveform software.

16. The full function node of claim 15, wherein said general purpose processor receives and processes inputs from multiple other nodes thereby improving detection performance and reducing a data rate to an operations center.

17. A reduced function node, comprising:

a wideband transceiver having a size less than 7 cubic inches and less than 3 watts in transmit power consumption;

at least one of a commercial and a proprietary ad hoc link and routing protocol that operationally connects said plurality of sensor nodes automatically;

a sensor interface for controlling and acquiring sensor inputs;

a software defined radio operably connected to the sensor interface for receiving, processing and digitizing sensor input data and electronically connected to the wideband transceiver for sending and receiving processed and digitized sensor data; and a battery power interface for providing power to the transceiver, the sensor interface and the software radio.

18. The reduced function node of claim 17, wherein the wideband transceiver consumes less than 1 watt in transmit power.

19. The reduced function node of claim 17, wherein said software defined radio further comprises: a digital signal processor operably connected to the sensor interface for processing and digitizing the acquired sensor input; and a general purpose processor operably interfaced to: the sensor interface for controlling acquisition of sensor input from the sensor interface, the digital signal processor for controlling processing of the sensor input, the transceiver for transmission of the processed and digitized sensor data and receipt and transmission of processing and digitized sensor data from another node, and the battery power interface for control thereof.

20. A reduced function node, comprising: a wideband transceiver having a size less than 7 cubic inches and less than 3 watts in transmit power consumption; a sensor interface for controlling and acquiring sensor inputs resulting from events; a software defined radio operably connected to the sensor interface for receiving, processing and digitizing sensor input data and electronically connected to the wideband transceiver for sending and receiving processed and digitized sensor data; and a battery power interface for providing power to the transceiver, the sensor interface and the software radio;

wherein said general purpose processor further comprises: core node stack software; and LAN waveform software.

21. A method for a scaleable wireless sensor network, comprising the steps of:

interconnecting said plurality of sensor nodes using at least one WLAN and at least one of a commercial and a proprietary ad hoc link and routing protocol that operationally connects said plurality of sensor nodes automatically;

connecting a gateway node to said at least one WLAN; and connecting an operations center to said gateway node using at least one standard wide area network (WAN) protocol.

22. The method of claim 21, wherein said plurality of sensor node types comprises at least one of chemical sensor, biological sensor, radiological sensor, nuclear sensor, high-yield explosive sensor, acoustic sensor, magnetic sensor, seismic sensor, micro-radar motion sensor, and imaging sensor.

23. The method of claim 21, wherein each of said plurality of sensor nodes comprises an embedded processor and a wideband transceiver that support multiple waveforms and multiple RF bands.

24. The method of claim 21, wherein said plurality of sensor nodes further comprises: at least one reduced function node; and at least one full function node.

25. The method of claim 21, wherein: each node is further configured to perform the step of processing at least a single LAN waveform; and each gateway node is further configured to perform the step of processing at least a WAN waveform.

26. The method of claim 21, wherein each node is powered by a power source selected from the group consisting of battery, solar and fuel cell.

27. A method for a scaleable wireless sensor network, comprising the steps of:

detecting and tracking events with a plurality of multi-waveform sensor nodes; interconnecting said plurality of sensor nodes using at least one WLAN; connecting a gateway node to said at least one WLAN; and connecting an operations center to said gateway node using at least one standard wide area network (WAN) protocol;

wherein said plurality of sensor nodes further comprises at least one reduced function node, and at least one full function node; and wherein said plurality of sensor nodes further comprises at least one mobile sweeper node having gateway node capability; and said at least one mobile sweeper node performing the steps of: registering with said at least one full function node, and passing data to said at least one full function node.

28. A method for an hierarchical wireless local area sensor node network, comprising the steps of:

providing at least one wireless local area network (WLAN) having at least one sensor node selected from the group consisting of a full function node and a reduced function node;

configuring the at least one WLAN in at least one hierarchical layer comprising the at least one sensor; and interfacing at least one gateway node by at least one of wireless communication or wireline communication between the at least one hierarchical layer and the at least one decision-making authority.

29. A method for a gateway node, comprising the steps of:

providing at least two wideband transceivers for transmitting and receiving data over a medium;

providing at least one of a commercial and a proprietary ad hoc link and routing protocol that operationally connects said plurality of sensor nodes automatically;

providing a sensor interface to perform the steps of controlling and acquiring sensor inputs;

operably connecting a software defined radio to the sensor interface to perform the steps of receiving, processing and digitizing sensor input data; electronically-connecting the software defined radio to the at least two wideband transceivers to perform the steps of sending and receiving processed and digitized sensor data; and providing a power interface for powering the at least two transceivers, the sensor interface and the software radio.

30. A method for a full function node, comprising the steps of:

providing a wideband transceiver for transmitting and receiving data over a medium;

providing at least one of a commercial and a proprietary ad hoc link and routing protocol that operationally connects said plurality of sensor nodes automatically;

providing a sensor interface for performing the steps of controlling and acquiring sensor inputs;

operably connecting a software defined radio to the sensor interface for performing the steps of receiving, processing and digitizing sensor input data;

electronically connecting the software defined radio to the wideband transceiver for performing the steps of sending and receiving processed and digitized sensor data; and providing a power interface powering the transceiver, the sensor interface and the software radio.

31. A method for a reduced function node, comprising the steps of:

providing a wideband transceiver having a size less than less 7 cubic inches and less than 3 watts in transmit power consumption;

providing a wideband transceiver for transmitting and receiving data over a medium;

providing at least one of a commercial and a proprietary ad hoc link and routing protocol that operationally connects said plurality of sensor nodes automatically;

including a sensor interface controlling and acquiring sensor inputs;

operably connecting a software defined radio to the sensor interface for performing the steps of receiving, processing and digitizing sensor input data;

electronically connecting the software defined radio to the wideband transceiver for performing the steps of sending and receiving processed and digitized sensor data; and a battery power interface powering the transceiver, the sensor interface and the software radio.

\* \* \* \* \*